(12) United States Patent
Kitano

(10) Patent No.: US 9,149,747 B2
(45) Date of Patent: Oct. 6, 2015

(54) CARBON FIBER MATERIAL, CARBON FIBER MATERIAL MANUFACTURING METHOD, AND MATERIAL CONTAINING THE CARBON FIBER MATERIAL

(71) Applicant: Tec One Co., Ltd., Nomi-shi (JP)

(72) Inventor: Takahiro Kitano, Nomi (JP)

(73) Assignee: Tec One Co., Ltd., Nomi-shi (JP)

( * ) Notice: Subject to any disclaimer, the term of this patent is extended or adjusted under 35 U.S.C. 154(b) by 0 days.

(21) Appl. No.: 14/122,899

(22) PCT Filed: Oct. 18, 2012

(86) PCT No.: PCT/JP2012/076956
§ 371 (c)(1),
(2) Date: Nov. 27, 2013

(87) PCT Pub. No.: WO2013/157160
PCT Pub. Date: Oct. 24, 2013

(65) Prior Publication Data
US 2014/0091033 A1 Apr. 3, 2014

(30) Foreign Application Priority Data

Apr. 18, 2012 (JP) ................. 2012-094963

(51) Int. Cl.
*H01M 4/38* (2006.01)
*H01M 4/66* (2006.01)
(Continued)

(52) U.S. Cl.
CPC ............... *B01D 39/086* (2013.01); *C08K 7/18* (2013.01); *C08L 101/00* (2013.01); *D01D 1/02* (2013.01);
(Continued)

(58) Field of Classification Search
CPC ............ D01F 9/14; D01F 9/145; D01F 9/15; D01F 9/155; D01F 9/12; D01F 9/20; D01F 11/10; D01F 11/14; D01F 11/16; C01B 31/02; C01B 31/0206; D04H 1/4242; H01M 4/625; H01M 4/38; H01M 4/386; H01M 4/387; H01M 4/66; H01M 4/663; H01M 4/96; H01M 4/86; H01M 4/865; H01M 4/88; H01M 4/8878; B01D 39/02; B01D 39/06; B01D 39/14; B01D 39/2065; B01D 39/2055; B01D 71/021; D01D 5/18; D01D 10/02; B82Y 40/00; H01G 11/40; Y10T 442/61
USPC ............... 423/445, 445 R, 461, 447.1, 447.2, 423/447.3, 447.7; 210/505, 508; 428/364, 428/367; 977/762; 442/349; 264/8, 165
See application file for complete search history.

(56) References Cited

U.S. PATENT DOCUMENTS 4,861,653 A    8/1989  Parrish
5,298,576 A *  3/1994  Sumida et al. ................. 525/528

(Continued)

FOREIGN PATENT DOCUMENTS

CN    1031734 A      3/1989
EP    0 644 603 A1   3/1995

(Continued)

OTHER PUBLICATIONS

Chinese Search Report issued Apr. 25, 2014, in Chinese Patent Application No. 201280024169X with English translation of category of cited documents.

(Continued)

*Primary Examiner* — Joseph Drodge
(74) *Attorney, Agent, or Firm* — Oblon, McClelland, Maier & Neustadt, L.L.P.

(57) ABSTRACT

The object of the present invention is to provide carbon fiber material having high electrical conductivity at a low cost. A manufacturing method of carbon fiber material comprises a dispersion liquid preparation step, a centrifugal spinning step and a denaturation step. The dispersion liquid preparation step is a step in which dispersion liquid containing resin and carbon particles is prepared. The centrifugal spinning step is a step in which nonwoven fabric made of a carbon fiber precursor is formed from the dispersion liquid. The denaturation step is a step in which the carbon fiber precursor denatures into carbon fiber.

25 Claims, 6 Drawing Sheets

(51) Int. Cl.
| | |
|---|---|
| H01M 4/86 | (2006.01) |
| H01M 4/88 | (2006.01) |
| D01F 9/12 | (2006.01) |
| D01F 11/14 | (2006.01) |
| D01F 9/14 | (2006.01) |
| D01F 9/15 | (2006.01) |
| B01D 39/06 | (2006.01) |
| B01D 39/14 | (2006.01) |
| B01D 71/02 | (2006.01) |
| C01B 31/02 | (2006.01) |
| B01D 39/08 | (2006.01) |
| C08K 7/18 | (2006.01) |
| D04H 1/4242 | (2012.01) |
| D01D 5/04 | (2006.01) |
| D01D 5/18 | (2006.01) |
| D01F 1/10 | (2006.01) |
| C08L 101/00 | (2006.01) |
| D01F 9/145 | (2006.01) |
| D01F 9/20 | (2006.01) |
| H01M 4/62 | (2006.01) |
| H01M 8/02 | (2006.01) |
| H01M 4/96 | (2006.01) |
| D01D 1/02 | (2006.01) |
| D01F 6/14 | (2006.01) |
| D01F 6/16 | (2006.01) |
| H01G 11/40 | (2013.01) |
| H01M 4/587 | (2010.01) |
| H01M 4/134 | (2010.01) |
| H01M 10/052 | (2010.01) |

(52) U.S. Cl.
CPC .. *D01D 5/04* (2013.01); *D01D 5/18* (2013.01); *D01F 1/10* (2013.01); *D01F 9/145* (2013.01); *D01F 9/20* (2013.01); *D04H 1/4242* (2013.01); *H01M 4/625* (2013.01); *H01M 4/663* (2013.01); *H01M 4/96* (2013.01); *H01M 8/0234* (2013.01); *D01F 6/14* (2013.01); *D01F 6/16* (2013.01); *H01G 11/40* (2013.01); *H01M 4/134* (2013.01); *H01M 4/386* (2013.01); *H01M 4/387* (2013.01); *H01M 4/587* (2013.01); *H01M 10/052* (2013.01); *Y02E 60/13* (2013.01); *Y02E 60/50* (2013.01); *Y10T 442/61* (2015.04); *Y10T 442/681* (2015.04)

(56) References Cited

U.S. PATENT DOCUMENTS

| | | | |
|---|---|---|---|
| 5,556,723 | A | 9/1996 | Ohsaki et al. |
| 6,194,344 | B1 * | 2/2001 | Tsuchitani et al. ........... 502/174 |
| 8,808,609 | B2 * | 8/2014 | Kitano et al. ................. 264/465 |
| 2003/0008211 | A1 | 1/2003 | Zeng |
| 2007/0122687 | A1 * | 5/2007 | Sakurai et al. ................. 429/42 |
| 2008/0050304 | A1 | 2/2008 | Oya et al. |
| 2011/0033705 | A1 * | 2/2011 | Komura et al. ............... 428/401 |
| 2012/0156389 | A1 * | 6/2012 | Kotov ........................... 427/532 |

FOREIGN PATENT DOCUMENTS

| | | |
|---|---|---|
| EP | 1 995 361 A1 | 11/2008 |
| JP | 2002-194624 A | 7/2002 |
| JP | 2006-183225 | 7/2006 |
| JP | 2006-183227 | 7/2006 |
| JP | 2009 203565 | 9/2009 |
| JP | 4697901 B1 | 6/2011 |
| WO | 2005 045115 | 5/2005 |
| WO | 2006 016641 | 2/2006 |
| WO | 2011 089754 | 7/2011 |

OTHER PUBLICATIONS

International Search Report Issued Jan. 22, 2013 in PCT/JP12/076956 Filed Oct. 18, 2012.
Notice of Allowance Issued Jul. 24, 2013 in Japanese Application No. 2013-505242 (with English translation).
Extended European Search Report issued Oct. 17, 2014 in Patent Application No. 12874669.0.
Office Action mailed Jun. 5, 2015, in European Patent Application No. 12 874 669 filed Oct. 18, 2012.

* cited by examiner

CARBON FIBER MATERIAL, CARBON FIBER MATERIAL MANUFACTURING METHOD, AND MATERIAL CONTAINING THE CARBON FIBER MATERIAL

TECHNICAL FIELD

The present invention relates to technology regarding carbon fiber materials.

BACKGROUND ART

Carbon fiber is attracting increasing attention in the fields of storage batteries (lithium-ion batteries, electric double layer capacitors, etc.) and fuel cells. Especially, nonwoven fabric made of carbon fiber is gaining much attention as an electrode material and a conductive assistant for such batteries/cells. The nonwoven fabric is formed of carbon fiber whose fiber diameter is approximately 10 μm.

In recent years, nonwoven fabric formed of carbon fiber whose fiber diameter is 10 μm or less (e.g., approximately 1 μm) is being requested from the viewpoint of increasing the surface area.

Meanwhile, a technology performing carbonization and graphitization after performing electrostatic spinning by melting pitch has been proposed (Patent Literature 1).

The carbon fiber obtained by this method is low in the fiber diameter variations and is also high in the degree of graphitization. However, since only carbon sources of high carbonization ratio are used in this method, the degree of shrinkage of the material is low in the carbonization and the graphitization. Consequently, the aforementioned carbon fiber whose fiber diameter is 10 μm or less is hardly obtained. Further, only soft pitch (melting point: 300° C. or lower) is used in the technology of the Patent Literature 1, that is, the use of mesophase pitch or hard pitch (melting point: 300° C. or higher) has been impossible. Furthermore, since application of voltage to the pitch while heating the pitch is necessary, the apparatus is necessitated to be complex and the productivity is low.

As a method for producing such carbon fiber whose fiber diameter is 10 μm or less (e.g., approximately 1 μm), there has been proposed a technology performing a carbonization process and a shredding process after performing electrostatic spinning by using resin containing carbon sources (Patent Literature 2). According to this method, the use of catalytic metal is unnecessary and the electrical conductivity of the obtained carbon fiber is relatively high. Nevertheless, low electric resistance is required for use as battery materials and further improvement in the electrical conductivity is being requested in these years. In addition, due to the employment of the electrostatic spinning method, the productivity of the technology of the Patent Literature 2 is low, leading to high costs.

CITATION LIST

Patent Literature

Patent Literature 1: JP2009-203565A
Patent Literature 2: Japanese Patent No. 4697901

SUMMARY OF INVENTION

Technical Problem

A first object of the present invention is to provide carbon fiber material (carbon fiber, nonwoven fabric made of carbon fiber) that is low in the price and high in the electrical conductivity.

A second object of the present invention is to provide carbon fiber material (carbon fiber, nonwoven fabric made of carbon fiber) that is small in the fiber diameter, low in the fiber diameter variations, and small in the amount of mixing of metallic particles.

Solution to Problem

The above first object is achieved by a manufacturing method of carbon fiber material, comprising a dispersion liquid preparation step, a centrifugal spinning step and a denaturation step, wherein:

the dispersion liquid preparation step is a step in which dispersion liquid containing resin and carbon particles is prepared, and the centrifugal spinning step is a step in which nonwoven fabric made of a carbon fiber precursor is formed from the dispersion liquid, and the denaturation step is a step in which the carbon fiber precursor denatures into carbon fiber.

Preferably, in the above manufacturing method of carbon fiber material, the dispersion liquid used for the centrifugal spinning step has viscosity of 10-10,000 mPa·S in measurement with a coaxial cylinder viscometer.

Preferably, in the above manufacturing method of carbon fiber material, the dispersion liquid used for the centrifugal spinning step has a solid content concentration of 0.1-50 mass %.

Preferably, in the above manufacturing method of carbon fiber material, revolution speed (number of revolutions) of a disk of a centrifugal spinning device in the centrifugal spinning step is 1,000-100,000 rpm.

Preferably, in the above manufacturing method of carbon fiber material, the dispersion liquid used for the centrifugal spinning step contains at least pitch.

Preferably, the above manufacturing method of carbon fiber material further comprises a fabric unraveling step in which the nonwoven fabric is unraveled. The carbon fiber material is carbon fiber.

The above first object is achieved by carbon fiber material which is obtained by the above carbon fiber material manufacturing method.

Preferably, in the above carbon fiber material, the carbon fiber of the carbon fiber material has a large diameter part where the diameter of the carbon fiber is large and a small diameter part where the diameter of the carbon fiber is small. The diameter of the large diameter part is 20 nm-2 μm. The diameter of the small diameter part is 10 nm-1 μm. A condition (diameter in the large diameter part)>(diameter in the small diameter part) is satisfied.

The present invention provides a member used for an electrical device, wherein the member is configured by using the above carbon fiber material.

The above member is, for example, an electrode of a battery, an electrode of a lithium-ion secondary battery, an electrode that is used for a lithium-ion secondary battery and contains a conductive assistant made of carbon fiber material, an electrode of a capacitor, or a porous carbon electrode base material for a fuel cell.

The present invention provides an electrical device comprising the above member used for an electrical device.

The present invention provides a filter which is configured by using the above carbon fiber material.

The present invention provides polymeric composite material which is formed by using the above carbon fiber material.

Advantageous Effect of Invention

According to the present invention, carbon fiber material (carbon fiber or nonwoven fabric made of carbon fiber) having high conductivity can be obtained at a low cost.

DESCRIPTION OF EMBODIMENTS

Figure 1:
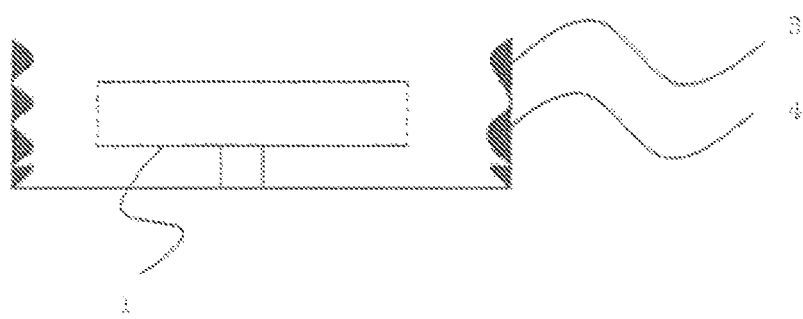
FIG. 1 is a schematic side view of a centrifugal spinning apparatus.

The first invention is a manufacturing method of carbon fiber material. This method comprises a dispersion liquid preparation step, a centrifugal spinning step and a denaturation step. Depending on the case, the manufacturing method further comprises a fabric unraveling step. The carbon fiber material obtained in cases where the manufacturing method does not comprise the fabric unraveling step is nonwoven fabric, in general. The carbon fiber material obtained in cases where the manufacturing method comprises the fabric unraveling step is carbon fiber, in general. The dispersion liquid preparation step is a step in which dispersion liquid containing resin and carbon particles is prepared. The centrifugal spinning step is a step in which nonwoven fabric is formed from the dispersion liquid by means of centrifugal spinning. The nonwoven fabric is made of a carbon fiber precursor. The denaturation step is a step in which the carbon fiber precursor denatures into carbon fiber. The fabric unraveling step is a step in which the nonwoven fabric is unraveled.

Preferably, the dispersion liquid has viscosity of 10-10000 mPa·S in measurement with a coaxial cylinder viscometer. Preferably, the dispersion liquid has a solid content concentration of 0.1-50 mass %. Preferably, the dispersion liquid contains at least pitch. Preferably, pitch is generated as the carbon particles.

In the centrifugal spinning step, the revolution speed of a disk of a centrifugal spinning device is preferably 1,000-100,000 rpm.

The centrifugal spinning method is capable of using liquid of higher viscosity compared to the electrostatic spinning method. The centrifugal spinning method is capable of using dispersion liquid of a higher solid content concentration compared to the electrostatic spinning method. The centrifugal spinning method is less susceptible to humidity and temperature compared to the electrostatic spinning method. Therefore, the centrifugal spinning method is capable of continuing stable fiber spinning for a long time. Further, the centrifugal spinning method has higher productivity compared to the electrostatic spinning method. Consequently, carbon fiber materials can be manufactured with high productivity and at low costs by the centrifugal spinning method.

The centrifugal spinning method is a fiber spinning method employing the centrifugal force, and thus the draw ratio in the fiber spinning process is high. Probably due to the high draw ratio, the degree of orientation of the carbon particles (pitch particles) in the fiber is high. In addition, the electrical conductivity is high, the diameter of the obtained carbon fiber is small, the variations in the fiber diameter are low, and the amount of mixing of metallic particles is small. In cases of nonwoven fabric, the surface area is large. The carbon fiber material is suitable for use as an electrode material, for example. Especially, the large surface area contributes to a high injection speed of the electrolytic solution and a shortened tact time. The obtained carbon fiber has a high aspect ratio, and thus the internal resistance of a battery can be reduced by using the carbon fiber as a conductive assistant.

The denaturation step is a step in which the carbon fiber precursor constituting the nonwoven fabric obtained in the centrifugal spinning step denatures into carbon fiber. This step is basically a heating step. In this heating step, the nonwoven fabric (nonwoven fabric made of the carbon fiber precursor) is heated up to 50-4000° C., for example.

Preferably, the denaturation step includes a resin removal step. This resin removal step is a step in which resin contained in the nonwoven fabric obtained in the centrifugal spinning step is removed. The resin removal step is a heating step, for example. This heating step is a step in which the nonwoven fabric (obtained in the centrifugal spinning step) is heated in an oxidizing gas atmosphere, for example.

Preferably, the denaturation step includes a carbonization step. This carbonization step is a step in which the nonwoven fabric (especially, the nonwoven fabric after the resin removal step) undergoes a carbonization process.

Preferably, the denaturation step includes a graphitization step. This graphitization step is a step in which the nonwoven fabric (especially, the nonwoven fabric after the carbonization step) undergoes a graphitization process. The graphitization step is a heating step, for example. This heating step is a step in which the nonwoven fabric (especially, the nonwoven fabric after the carbonization step) is heated in an inert gas atmosphere, for example. The heating step is a heat generation (heating) step performed by feeding electric current to the nonwoven fabric (especially, the nonwoven fabric after the carbonization step), for example.

The fabric unraveling step is a step in which the nonwoven fabric is pulverized, for example. The fabric unraveling step can also be a step in which the nonwoven fabric is beaten. Carbon fiber is obtained by the fabric unraveling step.

Preferably, the resin is water-soluble resin or pyrolytic resin. Particularly preferably, the resin is water-soluble and pyrolytic resin. The most preferable resin is polyvinyl alcohol. Preferably, the carbon particles are pitch. The pitch is preferably hard pitch or mesophase pitch, and particularly preferably, mesophase pitch. The ratio (the amount of the pitch)/(the amount of the resin) is preferably 0.05-2 (more preferably 0.1-1) (by mass).

The second invention is carbon fiber material. The carbon fiber material is nonwoven fabric made of carbon fiber, for example. The carbon fiber material can also be carbon fiber. The carbon fiber material is obtained by the carbon fiber material manufacturing method described above.

Preferably, the carbon fiber has a large diameter part where the diameter of the carbon fiber is large and a small diameter part where the diameter of the carbon fiber is small. The diameter of the large diameter part is 20 nm-5 μm. The diameter of the small diameter part is 10 nm-3 µm. A condition "(diameter in the large diameter part)>(diameter in the small diameter part)" is satisfied.

The carbon fiber preferably has a plurality of large diameter parts. The carbon fiber preferably has a plurality of small diameter parts. The diameter of the large diameter part is preferably 20 nm-5 µm (more preferably 20 nm-2 µm (still more preferably 50 nm-1 µm). The diameter of the small diameter part is preferably 10 nm-3 µm (more preferably 10 nm-1 µm (still more preferably 20 nm-500 nm). Of course, a condition A: "(diameter (average value of the diameter) in the large diameter part)>(diameter (average value of the diameter) in the small diameter part)" is satisfied. Preferably, a condition B: "(maximum value of the diameter in the large diameter part)/(minimum value of the diameter in the small diameter part)=1.1-100" is satisfied. More preferably, a condition C: "(maximum value of the diameter in the large diameter part)/(minimum value of the diameter in the small diameter part)=2-50" is satisfied.

The length of the small diameter part is greater than the minimum value of the diameter in the large diameter part, for example. The length of the small diameter part is less than the maximum value of the diameter in the large diameter part, for example. The length of the small diameter part is preferably 10 nm-10 µm (more preferably 50 nm-1 µm). The length of the large diameter part is preferably 50 nm-10 µm (more preferably 500 nm-3 µm).

The length (total length) of the carbon fiber is preferably 0.1 µm-1000 µm (more preferably 10 µm-500 µm (e.g., 0.5-100 µm when used after being pulverized)). The specific surface area of the carbon fiber is preferably 1-100 $m^2/g$ (more preferably 2-50 $m^2/g$).

Preferably, the carbon fiber in X-ray diffraction measurement has a peak deriving from the graphite structure (002) in a range of 25°-30° (2θ). The half value width of the peak is preferably 0.1-2.

Preferably, the carbon fiber satisfies a condition D: "ID/IG=0.1-2". The "ID" represents the intensity of a Raman spectroscopy peak of the carbon fiber existing in a range of 1300-1400 $cm^{-1}$. The "IG" represents the intensity of a Raman spectroscopy peak of the carbon fiber existing in a range of 1580-1620 $cm^{-1}$. An $Ar^+$ laser is preferable as the excitation light source for the measurement.

Preferably, the carbon fiber satisfies a condition E: "$L/(S)^{1/2}$=2-300 (preferably 5-300)". The "S" represents the area of the carbon fiber in an image acquired by observing the carbon fiber by use of a scanning electron microscope. The "L" represents the outer perimeter of the carbon fiber in the image acquired by observing the carbon fiber by use of the scanning electron microscope. The carbon fiber having these features is obtained by the aforementioned manufacturing method of carbon fiber (manufacturing method of preferable carbon fiber).

In cases where the carbon fiber material is nonwoven fabric, the content percentage of the carbon fiber in the nonwoven fabric is preferably 50-100 mass % (more preferably 80 mass % or higher). The thickness of the nonwoven fabric is preferably 0.1 µm-10 mm (more preferably 10 µm-500 µm). The weight per unit area of the nonwoven fabric is preferably 1-10,000 $g/m^2$ (more preferably 10-1,000 $g/m^2$). The specific surface area of the nonwoven fabric is preferably 1-50 $m^2/g$ (more preferably 2-30 $m^2/g$).

The third invention is a member used for an electrical device. The member is configured by using the carbon fiber material described above. The member is an electrode of a battery, for example. For example, the member can be an electrode of a lithium-ion secondary battery. For example, the member can be an electrode that is used for a lithium-ion secondary battery and contains a conductive assistant made of carbon fiber material. For example, the member can be an electrode of a capacitor (electric double layer capacitor). For example, the member can be a porous carbon electrode base material for a fuel cell.

The fourth invention is an electrical device. The electrical device comprises the member described above.

The fifth invention is a filter. The filter is configured by using the carbon fiber material described above.

The sixth invention is polymeric composite material. The polymeric composite material is formed by using the carbon fiber material described above.

More details will be explained below.

[Dispersion Liquid Preparation Step (Step I)]

The dispersion liquid contains resin and carbon particles.

Preferably, the resin is resin that dissolves in a solvent (solvent that volatilizes during the centrifugal spinning). Specifically, the resin can be vinyl resin (polyvinyl alcohol (PVA), polyvinyl butyral (PVB), etc.). The resin can also be polyethylene oxide (PEO). The resin can also be acrylic resin (polyacrylic acid (PAA), polymethyl methacrylate (PMMA), polyacrylonitrile (PAN), etc.). The resin can also be fluororesin (e.g., polyvinylidene difluoride (PVDF)). The resin can also be a polymer deriving from a natural product (e.g., cellulosic resin and its derivatives (polylactic acid, chitosan, carboxymethylcellulose (CMC), hydroxyethylcellulose (HEC), etc.). The resin can also be engineering plastic resin such as polyethersulfone (PES). The resin can also be polyurethane resin (PU), polyamide resin (nylon), aromatic-polyamide resin (aramid resin), polyester resin, polystyrene resin, or polycarbonate resin. The resin can also be a mixture or a copolymer of resins described above.

From the anti-VOC (volatile organic compounds) viewpoint, the resin is desired to be water-soluble resin. For example, polyvinyl alcohol (PVA), polyvinyl butyral (PVB), polyethylene oxide (PEO), polyacrylic acid (PAA), cellulose derivatives, etc. can be employed.

Preferably, the resin is resin that does not undergo melting or fusion in the resin removal step (heat treatment step: heating step). From this viewpoint, the resin is desired to be pyrolytic resin. The pyrolytic resin is a type of resin that pyrolytically decomposes before undergoing heat deformation (melting, fusion) when heated. For example, polyvinyl alcohol, cellulose derivatives, polyacrylic acid (PAA), fully aromatic polyamide resin (aramid), etc. can be employed. A preferable resin can be polyvinyl alcohol, a cellulose derivative or polyacrylic acid (PAA). A particularly preferable resin is polyvinyl alcohol.

Preferably, the solvent is solvent that volatilizes during the centrifugal spinning. For example, the solvent can be water, acid (acetic acid, formic acid, etc.), alcohol (methanol, ethanol, propanol, butanol, isobutyl alcohol, amyl alcohol, isoamyl alcohol, cyclohexanol, etc.), ester (ethyl acetate, butyl acetate, etc.), ether (diethyl ether, dibutyl ether, tetrahydrofuran, etc.), or ketone (acetone, methyl ethyl ketone, methyl isobutyl ketone, etc.). The solvent can also be aprotic polar solvent (N,N-dimethylformamide, dimethylsulfoxide, acetonitrile, dimethyl acetamide, etc.) or halogenated hydrocarbon (trichloromethane, tetrachloromethane, hexafluoroisopropyl alcohol, etc.). The solvent can also be a mixture of compounds described above.

From the anti-VOC (volatile organic compounds) viewpoint, a preferable solvent can be water, alcohol, or a mixture of water and alcohol. A particularly preferable solvent is water.

Carbon black, fullerenes, carbon nanotubes, etc. are well known as examples of the carbon particles. Preferably, the carbon particles used in this step 1 is pitch. Preferable pitch is hard pitch or mesophase pitch. Mesophase pitch is particularly preferable. Carbon particles other than pitch may also be used together. The pitch is substantially made up of carbon only. The pitch does not dissolve in the solvent. The fixed carbon percentage of the mesophase pitch is preferably 50-100% (more preferably 70-95% (still more preferably 80-90%). The melting point of the mesophase pitch is preferably 250-400° C. (more preferably 280-350° C. (still more preferably 300-330° C.). The grain diameter of the carbon particles (in the dispersion liquid) is preferably 10-1000 nm (more preferably 50 nm or greater, still more preferably 100 nm or greater, more preferably 500 nm or less, still more preferably 300 nm or less).

From the viewpoints of strength and electrical conductivity, the pitch dispersion liquid contains carbon nanotubes, as needed. The carbon nanotubes can be single-wall carbon nanotubes (SWNT), multi-wall carbon nanotubes (MWNT), or a mixture of single-wall carbon nanotubes and multi-wall carbon nanotubes. The multi-wall carbon nanotubes (MWNT) are used from the viewpoint of practicality. For introducing the carbon nanotubes, a method of adding carbon nanotube powder (or carbon nanotube dispersion liquid) to the pitch dispersion liquid is employed. The mixture of the carbon nanotube dispersion liquid and the pitch dispersion liquid is desirable. The amount of the carbon nanotubes is preferably 0.01-10 pts. mass (more preferably 0.1-1 pts. mass) relative to 100 pts. mass of the pitch.

The pitch (carbon particle) dispersion liquid contains a graphitization promoter, as needed. The graphitization promoter is a catalyst having the function of promoting the degree of graphitization. The graphitization promoter is a boron-based promoter (boron, boric ester, boron carbide, etc.) or a silicon-based promoter (silicon, silicic acid ester, silicon carbide, etc.), for example. A preferable graphitization promoter is boron carbide or silicon carbide. The amount of the graphitization promoter is preferably 1-10,000 mass ppm (more preferably 10-1,000 mass ppm) relative to the carbon particles. In cases where the graphitization promoter is liquid, the graphitization promoter and the pitch dispersion liquid are mixed together. In cases where the graphitization promoter is powder, a dispersion liquid of the graphitization promoter is prepared first and then the graphitization promoter dispersion liquid and the pitch dispersion liquid are mixed together.

The pitch dispersion liquid contains a dispersing agent, as needed. The dispersing agent is a surface-active agent or a polymer, for example. The amount of the dispersing agent is preferably 1-200 pts. mass (more preferably 10-100 pts. mass) relative to 100 pts. mass of pitch.

Preferably, the mixture ratio of the resin and the carbon particles (e.g. pitch) is set as follows: If an excessive amount of resin is used, the amount of carbon particles remaining after the carbonization becomes too small. In contrast, if the amount of the resin is too small, the centrifugal spinning becomes difficult. Therefore, the amount of the carbon particles (pitch) is preferably 5-200 pts. mass (more preferably 10-100 pts. mass) relative to 100 pts. mass of the resin. In cases where the carbon fiber having the aforementioned large diameter part and small diameter part should be obtained, the amount of the carbon particles (pitch) is preferably 10-100 pts. mass (more preferably 10-50 pts. mass) relative to 100 pts. mass of the resin.

If the concentration of the solid content (other than the solvent) in the dispersion liquid is too high, the fiber spinning is difficult. The fiber spinning is difficult also when the concentration is too low. Therefore, the concentration of the solid content is preferably 0.1-50 mass % (more preferably 1-30 mass % (still more preferably 5-20 mass %)).

If the viscosity of the dispersion liquid is too high, the dispersion liquid does not come out from the nozzle in the fiber spinning. In contrast, the fiber spinning is difficult if the viscosity is too low. Therefore, the viscosity of the dispersion liquid (measured in the fiber spinning by use of a coaxial cylinder viscometer) is preferably 10-10,000 mPa·S (more preferably 50-5000 mPa·S (still more preferably 500-5000 mPa·S)).

The preparation of the dispersion liquid includes a mixing step and a micronization step. The mixing step is a step in which the resin and the carbon particles (pitch) are mixed together. The micronization step is a step in which the carbon particles (pitch) are micronized. For example, the micronization step can be a step in which shearing force is applied to the carbon particles (pitch). The carbon particles (pitch) are micronized by the micronization step. Either the mixing step or the micronization step may be executed first. The mixing step and the micronization step may also be conduced at the same time.

The mixing step can be carried out in three cases: a case where both the resin and the carbon particles (pitch) are powder, a case where one is powder and the other is solution (dispersion liquid), and a case where both are solution (dispersion liquid). From the viewpoint of operability, the case where both the resin and the carbon particles (pitch) are solution (dispersion liquid) is the most preferable.

The micronization step is executed by using a media-less beam mill, a beam mill, or an ultrasonic irradiator, for example. The media-less beam mill is preferably used when the mixing of foreign matter should be prevented. The beam mill is preferably used when the grain diameter of the carbon particles should be controlled. The ultrasonic irradiator is preferably used when simple and easy operation in the micronization step is desired. In the present invention in which the grain diameter control of the pitch (carbon particles) is essential, the beam mill is preferably used.

If the grain diameter of the carbon particles (pitch) in the dispersion liquid is too large, the fiber diameter becomes too large. If the grain diameter of the carbon particles (pitch) is too small, the dispersing condition becomes unstable. Therefore, the grain diameter of the carbon particles (pitch) is preferably 1 nm-10 μm (more preferably 100 nm-1 μm).

[Centrifugal Spinning Step (Step for Forming Nonwoven Fabric Made of Carbon Fiber Precursor) (Step II)]

Figure 2:
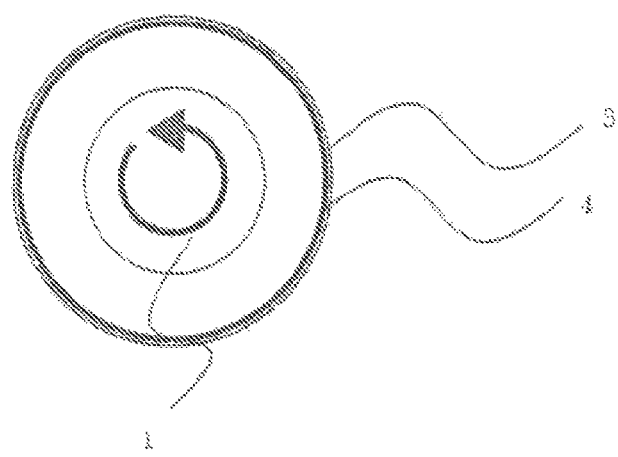
FIG. 2 is a schematic plan view of the centrifugal spinning apparatus.

A centrifugal spinning apparatus shown in FIGS. 1 and 2 is used, for example. FIG. 1 is a schematic side view of the centrifugal spinning apparatus. FIG. 2 is a schematic plan view of the centrifugal spinning apparatus. In FIGS. 1 and 2, the reference character "1" represents a rotating body (disk) having a hollow part inside and a nozzle/opening through its wall. The undiluted solution for the fiber spinning is filled in the inner part (hollow part) 2 (unshown) of the disk 1. The disk 1 is spun at a high speed. Accordingly, the undiluted fiber spinning solution is expanded by the centrifugal force and is deposited on a collector plate 3 along with volatilization of the solvent. By this deposition, the nonwoven fabric 4 is formed.

The centrifugal spinning method is capable of using an undiluted fiber spinning solution of higher viscosity compared to the electrostatic spinning method. This means that the solid content concentration of the solution is allowed to be high. The centrifugal spinning method is less susceptible to humidity and temperature compared to the electrostatic spinning method, and thus the fiber spinning can be continued stably for a long time. This means that the centrifugal spinning method has higher productivity (i.e., production at a lower cost) compared to the electrostatic spinning method. The employment of the centrifugal spinning method for the manufacture of carbon fiber materials achieves the following major advantages: The centrifugal spinning method employs the centrifugal force, and thus a higher draw ratio can be achieved compared to cases where the electrostatic spinning method is used. Probably due to the high draw ratio, the carbon particles are easily oriented in the same direction, as well as achieving high electrical conductivity.

The centrifugal spinning apparatus may further comprise a device for heating the disk 1 and/or a device for continuously supplying the undiluted fiber spinning solution. The centrifugal spinning apparatus is not restricted to the type shown in FIGS. 1 and 2. For example, the disk 1 can also be of the vertical type. The disk 1 may also be fixed to the upper part of the apparatus. The disk 1 may also be a bell-shaped disk or a pin-shaped disk employed for the publicly known spray dry devices. The collector plate 3 can also be of the continuous type instead of the batch type. The collector plate 3 may also be a cylinder in an inverted cone shape which is used for the publicly known spray dry devices. Heating the entire space in which the solvent evaporates is desirable since the solvent evaporates faster.

The revolution speed (angular speed) of the disk 1 is preferably 1,000-100,000 rpm (more preferably 5,000-50,000 rpm). Too low speed leads to a low draw ratio. Even though higher speed is more desirable, significant improvement of the draw ratio becomes difficult above a certain upper limit. Adversely, the load on the apparatus increases with the increase in the revolution speed. For the above reasons, the revolution speed was set within 100,000 rpm.

If the distance between the disk 1 and the collector plate 3 is too short, the evaporation of the solvent becomes difficult. In contrast, if the distance is too long, the apparatus becomes unnecessarily large. While the preferable distance varies depending on the size of the apparatus, the preferable distance between the disk 1 and the collector plate 3 is 20 cm-3 m when the diameter of the disk is 10 cm, for example.

The nonwoven fabric obtained by this step is made of a carbon fiber precursor. The carbon fiber precursor is a mixture of carbon particles (pitch) and resin before heat treatment. The nonwoven fabric has an appropriate thickness for the ease of handling. The thickness of the nonwoven fabric after the carbonization (graphitization) is preferably 0.1 µm-10 mm (more preferably 1 µm or greater, still more preferably 10 µm or greater, more preferably 1 mm or less, still more preferably 500 µm or less). The weight per unit area of the nonwoven fabric after the carbonization (graphitization) is preferably 1 g/m$^2$-1000 g/m$^2$ (more preferably 10 g/m$^2$-500 g/m$^2$).

The features of the present invention are achieved excellently by carbon fiber having irregularities (carbon fiber having the large diameter part and the small diameter part). Such carbon fiber having irregularities on its surface has a large surface area, by which the features of the present invention are achieved excellently. It is preferable that the fiber has the size described below. The diameter of the small diameter part after the carbonization (graphitization) was preferably 10 nm-3 µm (more preferably 10 nm-1 µm). The diameter of the large diameter part after the carbonization (graphitization) was preferably 20 nm-5 µm (more preferably 50 nm or greater, still more preferably 300 nm or greater, more preferably 1.5 µm or less, still more preferably 1 µm or less). Of course, the condition: "(diameter (average value of the diameter) in the large diameter part)>(diameter (average value of the diameter) in the small diameter part)" is satisfied. The effects targeted by the present invention were achieved excellently in cases where (maximum value of the diameter in the large diameter part)/(minimum value of the diameter in the small diameter part)=1.1-100 (preferably 2 or greater, more preferably 50 or less, still more preferably 20 or less). When the large diameter part was too thick, the fiber tended to snap off easily. When the large diameter part was too thin, the effects targeted by the present invention were weak. The length of the small diameter part after the carbonization (graphitization) was preferably 100 nm-30 µm (more preferably 500 nm-10 µm). The effects targeted by the present invention were weak when the length of the small diameter part was too short or too long. The length of the large diameter part after the carbonization (graphitization) was preferably 500 nm-10 µm (more preferably 1 µm-6 µm). The effects targeted by the present invention were weak when the length of the large diameter part was too short or too long. The length (total length) of the carbon fiber after the carbonization (graphitization) was preferably 0.1-1000 µm (more preferably 10-500 µm, 0.5-100 µm when used after being pulverized). The effects targeted by the present invention were weak when the fiber was too short.

The carbon fiber constituting the nonwoven fabric of the present invention is preferably carbon fiber having the features described above. However, carbon fiber not having the above features may also be contained. For example, the features of the present invention were not impaired seriously as long as (the amount of carbon fiber having the features of the present invention)/(the amount of carbon fiber having the features of the present invention+the amount of carbon fiber not having the features of the present invention) 0.5. The desired ratio is 0.6 or greater (preferably 0.7 or greater (more preferably 0.8 or greater (still more preferably 0.9 or greater))).

It is possible to stack up multiple sheets of the nonwoven fabric made of the carbon fiber precursor to form laminated nonwoven fabric. The laminated nonwoven fabric may be compressed by using a roller or the like. By the compression, the film thickness and the density are adjusted properly.

The nonwoven fabric made of the carbon fiber precursor is treated after being peeled off from the collector body, or directly in the state of adhering to the collector body. The generated nonwoven fabric may also be rolled up around a bar similarly to the making of a cotton candy.

[Denaturation Step (Step III)]
[Heat Treatment of Nonwoven Fabric Made of Precursor (Step III-1)]

Nonwoven fabric made of carbon fiber is obtained from the aforementioned nonwoven fabric made of the carbon fiber precursor. This is achieved by denaturation of the carbon fiber precursor into carbon fiber. The denaturation process is heat treatment (especially, heat treatment in an oxidizing gas atmosphere), for example. By the heat treatment, the resin constituting the carbon fiber precursor is removed, that is, carbon sources other than carbon particles are removed. Further, infusibilization of the carbon particles is carried out.

Preferably, this step is executed after the centrifugal spinning step (the above step II).

The oxidizing gas used in this step is a compound containing oxygen atoms or an electron acceptor compound. The oxidizing gas can be air, oxygen, halogen gas, nitrogen dioxide, ozone, water vapor or carbon dioxide, for example. Above all, air is the most preferable from the viewpoints of cost performance and quick infusibilization at low temperatures. The oxidizing gas can also be a gas containing halogen gas. The halogen gas can be fluorine, iodine or bromine, for example. Above all, iodine is the most preferable. The oxidizing gas can also be a mixed gas of above constituents.

The temperature for the heat treatment is preferably 100-400° C. (more preferably 150-350° C.). The time length of the heat treatment is preferably 3 minutes-24 hours (more preferably 5 minutes-2 hours).

Infusibilized carbon fiber precursor nonwoven fabric is obtained by this step. The softening point of the infusibilized carbon fiber precursor is preferably 400° C. or higher (more preferably 500° C. or higher).

In cases where the resin is crystalline resin, it is preferable to perform a crystallization process on the resin prior to this step. Preferably, the resin is kept at an appropriate temperature T (glass transition temperature≤T≤melting point) for an appropriate period (approximately 1 minute-1 hour). In the case of polyvinyl alcohol, the glass transition temperature is approximately 50-90° C. and the melting point is approximately 150-250° C.

This step is carried out in the sheet-by-sheet manner, or continuously roll to roll. Heat treatment in the rolled state is also possible. From the viewpoint of productivity, the roll-to-roll continuous heat treatment is preferable.

[Carbonization Process (Step III-2)]

In order to obtain the nonwoven fabric made of carbon fiber, it is preferable to perform a carbonization process. This carbonization process is heat treatment (preferably, heat treatment in an inert gas atmosphere). Through this step, the infusibilized carbon fiber precursor turns into carbon fiber. Preferably, this step is executed after the above step III-1.

The inert gas used in this step is gas undergoing no chemical reaction with the infusibilized carbon fiber precursor during the carbonization process. The inert gas can be nitrogen gas, argon gas or krypton gas, for example. Among these gases, nitrogen gas is the most preferable from the viewpoint of the cost.

The processing temperature for this step is preferably 500-2000° C. (more preferably 600-1500° C.). At temperatures below 500° C., the carbonization hardly proceeds. At temperatures over 2000° C., graphitization occurs. However, a temperature rise over 2000° C. has no problem in cases where the graphitization process (explained below) is carried out. The processing time of this step is preferably 5 minutes-24 hours (more preferably 30 minutes-2 hours).

[Graphitization Process (Step III-3)]

It is preferable to carry out the graphitization process. Preferably, the graphitization process is conducted in an inert gas atmosphere. This step is an essential step in cases where the nonwoven fabric is used for a purpose like an anode material of a lithium-ion battery. Preferably, this step is executed after the above step III-2.

The inert gas used in this step is gas undergoing no chemical reaction with the carbon fiber precursor during the graphitization process. The inert gas can be argon gas or krypton gas, for example. Nitrogen gas is undesirable since it undergoes ionization.

The processing temperature for this step is preferably 2000-3500° C. (more preferably 2300-3200° C.). The processing time of this step is preferably within 1 hour (more preferably 0.1-10 minutes).

This step is conducted by keeping the carbon fiber nonwoven fabric at the aforementioned temperature, especially by feeding electric current to the carbon fiber nonwoven fabric (energization). Specifically, the carbon fiber nonwoven fabric is kept at the aforementioned temperature by the Joule heat caused by the energization. The graphitization can also be achieved by microwave heating. From the viewpoint of the manufacturing cost, the graphitization process is conducted preferably by means of the heating by energization. Continuous processing by use of the roll-to-roll method is particularly preferable.

[Fiber Formation Process (Step IV)]

This step is a step for obtaining carbon fiber from the nonwoven fabric obtained in the above step. For example, this step is a step in which the nonwoven fabric obtained by the step II, the step III-1, the step III-2 or the step III-3 is pulverized. Preferably, this step is a step in which the nonwoven fabric obtained by the step III-2 or the step III-3 is pulverized. By the pulverization, fiber is obtained. Also by beating the nonwoven fabric, the nonwoven fabric is unraveled and fiber is obtained.

The pulverization is performed by use of a cutter mill, a hammer mill, a pin mill, a ball mill or a jet mill, for example. Either a wet process or a dry process can be employed. However, the dry process is preferable in cases where the fiber is used for a purpose like a non-aqueous electrolyte secondary battery.

Crushing of the fiber can be prevented by employing a media-less mill. Thus, the use of a media-less mill is preferable. For example, it is preferable to use an air jet mill or ultrasonic irradiation.

In cases where material other than fiber-shaped material is contained after the pulverization, it is preferable to employ a classification step. For example, employment of air flow classification (cyclone classification) or sieve classification is preferable.

[Electrode]

The carbon fiber nonwoven fabric (or the above carbon fiber) is used for members of electrical elements/devices (including electronic elements/devices). For example, the carbon fiber nonwoven fabric (or the carbon fiber) is used for members of storage batteries, capacitors, fuel cells, etc.

The carbon fiber nonwoven fabric (or the carbon fiber) is employed for an electrode of a storage battery. The storage battery can be a lead storage battery, a nickel-cadmium battery, a nickel hydride battery, a lithium-ion battery, a sodium-sulfur battery or a redox flow battery, for example (above all, lithium-ion battery). Preferably, the electrode is an anode. The carbon fiber nonwoven fabric (or the carbon fiber) is also employed preferably for an anode active material and a conductive agent.

A lithium-ion battery is made up of members such as a cathode (positive electrode), an anode (negative electrode), separators and an electrolytic solution. Each electrode (cathode/anode) is formed as follows: A mixture containing an active material, a conductive agent, a binding agent, etc. is deposited on a current collector (aluminum foil, copper foil, etc.) to form the electrode (cathode/anode).

Carbon materials such as nongraphitizing carbon (hardly graphitizable carbon), graphitizing carbon (easily graphitizable carbon), graphite, pyrolytic carbon, coke, glassy carbon, fired organic polymer compound, carbon fiber and activated charcoal can be taken as examples of the anode active material. Carbon materials containing at least one selected from a group consisting of elemental substances, alloys and compounds of metallic/metalloid elements capable of forming alloy with lithium are employed (hereinafter referred to as "alloy-based anode active materials").

Tin (Sn), lead (Pb), aluminum, indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf) can be taken as examples of the metallic elements and the metalloid elements.

Concrete examples of the compounds include LiAl, AlSb, CuMgSb, SiB$_4$, SiB$_6$, Mg$_2$Si, Mg$_2$Sn, Ni$_2$Si, TiSi$_2$, MoSi$_2$, CoSi$_2$, NiSi$_2$, CaSi$_2$, CrSi$_2$, Cu$_5$Si, FeSi$_2$, MnSi$_2$, NbSi$_2$, TaSi$_2$, VSi$_2$, WSi$_2$, ZnSi$_2$, SiC, Si$_3$N$_4$, Si$_2$N$_2$O, SiO$_v$ (0<v≤2), SnO$_w$ (0<w≤2), SnSiO$_3$, LiSiO, LiSnO, etc.

Lithium-titanium complex oxides (spinel type, ramstellite type, etc.) are also preferable.

As the cathode active material, any material capable of occluding and discharging lithium ions can be employed. For example, lithium-containing complex metallic oxide, olivine-type lithium phosphate, etc. are preferable examples.

The lithium-containing complex metallic oxide is metallic oxide containing lithium and transition metal, or metallic oxide in which part of the transition metal elements (contained in the metallic oxide) has been substituted with elements of different types. It is preferable that the lithium-containing complex metallic oxide contains at least one type of element selected from cobalt, nickel, manganese and iron as the transition metal element.

Concrete examples of the lithium-containing complex metallic oxide include Li$_k$CoO$_2$, Li$_k$NiO$_2$, Li$_k$MnO$_2$, Li$_k$Co$_m$Ni$_{1-m}$O$_2$, Li$_k$Co$_m$M$_{1-m}$O$_n$, Li$_k$Ni$_{1-m}$M$_m$O$_n$, Li$_k$Mn$_2$O$_4$, Li$_k$Mn$_{2-m}$MnO$_4$, etc. (M: at least one element selected from Na, Mg, Sc, Y, Mn, Fe, Co, Ni, Cu, Zn, Al, Cr, Pb, Sb and B, k=0-1.2, m=0-0.9, n=2.0-2.3), for example.

It is also possible to use a compound (lithium iron phosphorous oxide) having the olivine-type crystal structure and being represented by the general formula Li$_x$Fe$_{1-y}$M$_y$PO$_4$ (M: at least one element selected from Co, Ni, Cu, Zn, Al, Sn, B, Ga, Cr, V, Ti, Mg, Ca and Sr, 0.9<x<1.2, 0≤y<0.3). For example, LiFePO$_4$ is ideal as such a lithium iron phosphorous oxide.

Compounds represented by the general formula X—S—R—S—(S—R—S)n-S—R—S—X described in EP 415856 are used as lithium thiolate.

The separator is formed of a porous film made of synthetic resin (polyurethane, polytetrafluoroethylene, polypropylene, polyethylene, etc.) or a porous film made of ceramic. A separator formed by stacking up two or more types of porous films may also be used.

The electrolytic solution contains a nonaqueous solvent and electrolyte salt. The nonaqueous solvent can be cyclic carbonate (propylene carbonate, ethylene carbonate, etc.), chain ester (diethyl carbonate, dimethyl carbonate, ethyl methyl carbonate, etc.), or ether (γ-butyrolactone, sulfolane, 2-methyltetrahydrofuran, dimethoxyethane, etc.), for example. These substances may either be used separately or as a mixture of two or more of substances. The carbonate (carbonic ester) is preferable from the viewpoint of oxidation stability.

The electrolyte salt can be LiBF$_4$, LiClO$_4$, LiPF$_6$, LiSbF$_6$, LiAsF$_6$, LiAlCl$_4$, LiCF$_3$SO$_3$, LiCF$_3$CO$_2$, LiSCN, lower aliphatic lithium carboxylate, LiBCl, LiB$_{10}$Cl$_{10}$, lithium halide (LiCl, LiBr, LiI, etc.), borate (bis(1,2-benzenediolate(2-)-O,O')lithium borate, bis(2,3-naphthalenediolate(2-)-O,O') lithium borate, bis(2,2'-biphenyldiolate(2-)-O,O')lithium borate, bis(5-fluoro-2-olate-1-benzenesulfonic acid-O,O') lithium borate, etc.) or imide salt (LiN(CF$_3$SO$_2$)$_2$, LiN (CF$_3$SO$_2$)(C$_4$F$_9$SO$_2$), etc.), for example. Lithium salts such as LiPF$_6$ and LiBF$_4$ are preferable. LiPF$_6$ is particularly preferable.

A gel-like electrolyte in which an electrolyte solution is held in a polymer compound may also be used as the aforementioned electrolyte solution. The polymer compound can be, for example, polyacrylonitrile, polyvinylidene fluoride, copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, polycarbonate, etc. Polymer compounds having structure like polyacrylonitrile, polyvinylidene fluoride, polyhexafluoropropylene or polyethylene oxide are preferable from the viewpoint of electrochemical stability.

The conductive agent can be, for example, graphite (natural graphite, artificial graphite, etc.), carbon black (acetylene black, Ketjen black, channel black, furnace black, lamp black, thermal black, etc.), conductive fiber (carbon fiber, metal fiber), metal powder (e.g., Al), conductive whiskers (zinc oxide, potassium titanate, etc.), conductive metal oxide (titanium oxide, etc.), organic conductive material (phenylene derivative, etc.), carbon fluoride, etc.

The binding agent can be, for example, polyvinylidene fluoride, polytetrafluoroethylene, polyethylene, polypropylene, aramid resin, polyamide, polyimide, polyamide-imide, polyacrylonitrile, polyacrylic acid, methyl polyacrylate, ethyl polyacrylate, hexyl polyacrylate, polymethacrylic acid, polymethyl methacrylate polyethyl methacrylate, polyhexyl methacrylate, polyvinyl acetate, polyvinylpyrrolidone, polyether, polyether sulphone, hexafluoropolypropylene, styrene-butadiene rubber, modified acrylic rubber, carboxymethyl cellulose, etc.

Figure 3:
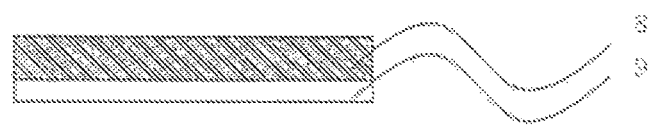
FIG. 3 is a schematic cross-sectional view of an anode of a lithium-ion battery.

The anode of the lithium-ion battery is generally formed by laminating (stacking, depositing) the anode active material (e.g., graphite material) 8 on a current collector plate (e.g., copper foil) 9 (see FIG. 3). The materials in accordance with the present invention can be used for both the anode active material and the current collector plate. The materials in accordance with the present invention can also be used exclusively for the anode active material. When a material in accordance with the present invention is used for the active material, the material can be used directly in the form of the nonwoven fabric, or in the form of powder obtained by pulverizing the nonwoven fabric. When a material in accordance with the present invention is used in the form of powder, it is possible to form the active material exclusively of the aforementioned carbon fiber. Incidentally, the active material in accordance with the present invention may also be used together with a conventional active material. In such cases, the amount of the aforementioned carbon fiber relative to the total amount of all the anode active materials is preferably 0.1-50 mass % (more preferably 1-30 mass % (particularly preferably 1-10 mass %)).

The aforementioned carbon fiber nonwoven fabric (or the aforementioned carbon fiber) is used also as the conductive assistant. Material having no conductivity (e.g., lithium cobaltate) is used for the cathodes of lithium-ion batteries. By use of the carbon fiber nonwoven fabric (or the carbon fiber), the internal resistance of the battery is reduced. When an alloy-based anode material having low conductivity is used in a lithium-ion battery, the carbon fiber nonwoven fabric (or the carbon fiber) can be used as the conductive assistant for the anode. The amount of the conductive assistant relative to the total amount of all the active materials used for the electrodes is preferably 0.1-20 mass % (more preferably 0.5-10 mass % (particularly preferably 0.5-3 mass %)).

The carbon fiber nonwoven fabric (or the carbon fiber) is used in the lithium-ion battery as the base material of the alloy-based anode active material. The charge/discharge capacity of the battery becomes high when an alloy of carbon material and silicon or tin is used as the anode active material. In this case, however, there is a problem in that the change in the volume of the active material due to the charging/discharging is great. Incidentally, the carbon fiber nonwoven fabric (or the carbon fiber) has voids, and thus the volume change of the active material at the times of charging/discharging is reduced if the aforementioned alloy (anode active material) is stacked on the carbon fiber nonwoven fabric (or the carbon fiber), that is, if the carbon fiber nonwoven fabric (or the carbon fiber) is used as the base material of the anode active material. This makes it possible to produce lithium-ion batteries having desirable cycle characteristics. The carbon fiber nonwoven fabric (or the carbon fiber) and the alloy-based anode active material are desired to be used in the following ratio: The amount of the carbon fiber nonwoven fabric (or the carbon fiber) relative to the amount of the alloy-based anode active material is preferably 0.01-1,000 mass % (more preferably 0.1-100 mass % (particularly preferably 0.1-30 mass %)).

In order to provide the carbon fiber nonwoven fabric (or the carbon fiber) with the alloy-based anode active material, a method of immersing the carbon fiber nonwoven fabric (or the carbon fiber) in a solution containing the anode active material is employed. Or, a method of applying the solution containing the anode active material on the carbon fiber nonwoven fabric (or the carbon fiber) is employed. It is also possible to employ physical deposition or chemical deposition. For example, vacuum evaporation, sputtering, ion plating, or laser ablation may be employed. CVD (Chemical Vapor Deposition) may also be employed. Thermal CVD or plasma CVD may also be employed. Wet plating may also be employed instead of the above dry plating methods. For example, electroplating or electroless plating may be employed. Besides, sintering may also be employed. For example, atmospheric sintering, reactive sintering or hot press sintering may be employed.

Figure 4:
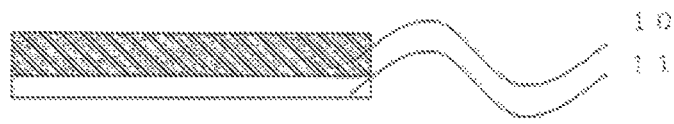
FIG. 4 is a schematic cross-sectional view of a negative electrode of a lithium-ion capacitor.

The carbon fiber nonwoven fabric (or the carbon fiber) is employed for an electrode of a capacitor. The capacitor can be an electric double layer capacitor. The capacitor can also be a lithium-ion capacitor. Preferably, the electrode is a negative electrode. The negative electrode of the lithium-ion capacitor is generally formed by laminating a negative electrode active material (e.g., graphite material) 10 on a current collector plate (e.g., copper foil) 11 (see FIG. 4). The materials in accordance with the present invention can be used for both the negative electrode active material and the current collector plate. The materials in accordance with the present invention can also be used exclusively for the negative electrode active material. When a material in accordance with the present invention is used exclusively for the active material, the material can be used directly in the form of the nonwoven fabric, or in the form of powder obtained by pulverizing the nonwoven fabric.

Figure 5:
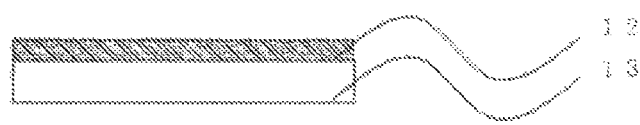
FIG. 5 is a schematic cross-sectional view of a fuel electrode of a fuel cell.

The carbon fiber nonwoven fabric (or the carbon fiber) is employed for the base material of a porous carbon electrode of a fuel cell. The fuel cell is a polymer electrolyte fuel cell. Preferably, the electrode is a fuel electrode (anode). The fuel electrode of the polymer electrolyte fuel cell is generally formed by laminating a catalyst layer 12 made of platinum-supported carbon and a polyelectrolyte on a porous carbon electrode base material 13 (FIG. 5).

[Filter]

The carbon fiber nonwoven fabric (or the carbon fiber) is employed for collecting or classifying particles. In other words, the carbon fiber nonwoven fabric (or the carbon fiber) is used as a filter.

[Polymeric Composite Material]

The carbon fiber in accordance with the present invention can be used as a conductive assistant for a polymeric composite material. The polymer as the base material is not particularly limited. For example, resins (hard resins) such as polycarbonate, polymethyl methacrylate, ABS resin and polyolefin (polyethylene, polypropylene) can be taken as examples. Soft resins may also be employed. For example, polyvinyl chloride, natural rubber, styrene-butadiene rubber, etc. may be used. Acrylic adhesive materials, light-curable resins, and adhesive agents (epoxy resin, polyvinyl alcohol, starch, etc.) are also usable. The amount of adding the carbon fiber varies depending on the type of the polymeric material. If the amount (content) of the carbon fiber is too high, the molding/formation becomes difficult. In contrast, the conductivity drops if the amount (content) of the carbon fiber is too low. Therefore, the content of the carbon fiber is preferably 0.01-80 mass % (more preferably 0.1-30 mass %).

In the following, this embodiment will be explained in more detail by describing several concrete examples. Incidentally, the present invention is not to be restricted to the particular illustrative examples described below.

EXAMPLE 1

70 pts. mass of polyvinyl alcohol (product name: POVAL 117: produced by Kuraray Co., Ltd.), 30 pts. mass of mesophase pitch (product name: AR: produced by Mitsubishi Gas Chemical Company, Inc.), and 400 pts. mass of water were mixed together by using a beads mill. By this process, a mesophase pitch dispersion liquid containing polyvinyl alcohol dissolved therein was prepared.

A centrifugal spinning apparatus (see FIGS. 1 and 2, distance between the nozzle and the collector body: 20 cm, disk revolution speed: 10,000 rpm) was used. Namely, the centrifugal spinning was conducted by using the above dispersion liquid (viscosity: 8500 mPa·S (measured with a coaxial cylinder viscometer (BH-type Viscometer manufactured by Tokimec Inc.))). Nonwoven fabric made of a carbon fiber precursor was produced on the collector plate. According to this method, fiber spinning equivalent to 5 kg (in terms of weight after the graphitization) was successfully performed in an hour.

The obtained nonwoven fabric was heated (300° C.) for 1 hour in air.

Thereafter, the nonwoven fabric was heated up to 900° C. in an argon gas atmosphere.

Subsequently, the nonwoven fabric was heated up to 3000° C. in a graphitizing furnace.

Figure 6:
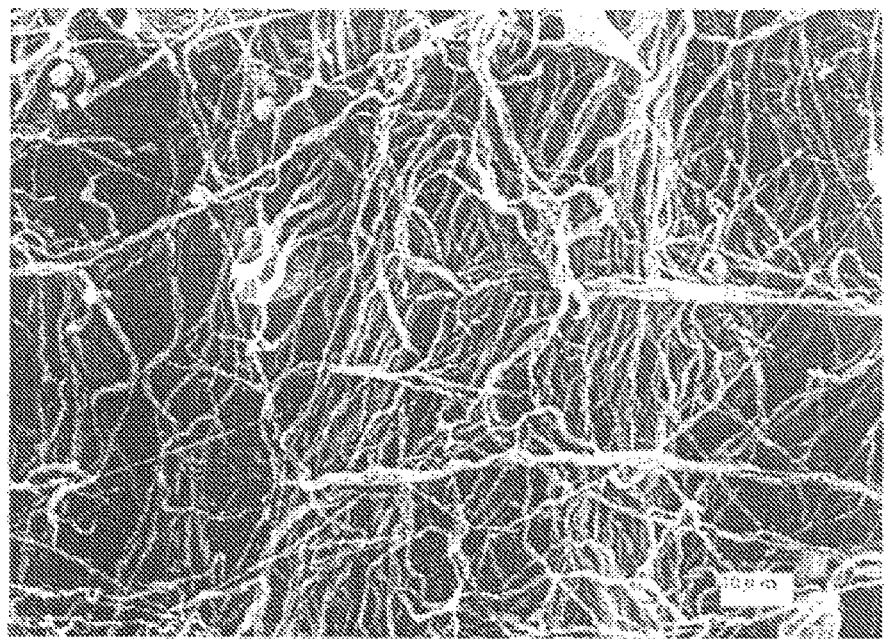
FIG. 6 is a SEM photograph.

A SEM photograph of the nonwoven fabric obtained in this example (SEM apparatus: VE-8800 manufactured by Keyence Corporation) is shown in FIG. 6. The carbon fiber in this nonwoven fabric had large diameter parts where the diameter of the carbon fiber is large (diameter: 20 nm-5 μm) and small diameter parts where the diameter of the carbon fiber is small (diameter: 10 nm-3 μm). Of course, the condition (diameter in the large diameter part)>(diameter in the small diameter part) was satisfied. The surface resistance of the nonwoven fabric was measured by the four-probe method (by using an apparatus manufactured by Mitsubishi Chemical Analytech Co., Ltd.). The result was 50 mΩ/square.

COMPARATIVE EXAMPLE 1

90 pts. mass of polyvinyl alcohol (product name: POVAL 117: produced by Kuraray Co., Ltd.), 10 pts. mass of mesophase pitch (product name: AR: produced by Mitsubishi Gas Chemical Company, Inc.), and 900 pts. mass of water were mixed together by using the beads mill. By this process, a mesophase pitch dispersion liquid containing polyvinyl alcohol dissolved therein was prepared.

Electrostatic spinning was conducted by using the above dispersion liquid and an electrostatic spinning apparatus. Namely, nonwoven fabric made of a carbon fiber precursor was produced on a collector body of the electrostatic spinning apparatus. In this method, fiber spinning equivalent to only 0.02 kg (in terms of weight after the graphitization) was possible in an hour. To sum up, the productivity was extremely low compared to the above example 1.

The obtained nonwoven fabric was heated (150° C.) for 10 minutes in air. Thereafter, the nonwoven fabric was heated (300° C.) for 1 hour.

Thereafter, the nonwoven fabric was heated up to 900° C. in an argon gas atmosphere.

Subsequently, the nonwoven fabric was heated up to 2800° C. in the graphitizing furnace.

The surface resistance of the nonwoven fabric was measured by the four-probe method (by using the apparatus manufactured by Mitsubishi Chemical Analytech Co., Ltd.). The result was 200 mΩ/square.

EXAMPLE 2

A production process was carried out similarly to the example 1 except that 90 pts. mass of polyvinyl alcohol (product name: POVAL 117: produced by Kuraray Co., Ltd.), 10 pts. mass of mesophase pitch (product name: AR: produced by Mitsubishi Gas Chemical Company, Inc.), and 400 pts. mass of water were used. As a result, carbon fiber nonwoven fabric equivalent to that of the example 1 was obtained.

EXAMPLE 3

A production process was carried out similarly to the example 1 except that polyacrylic acid (product name: AQUALIC AS58: produced by Nippon Shokubai Co., Ltd.) was used instead of polyvinyl alcohol. As a result, carbon fiber nonwoven fabric equivalent to that of the example 1 was obtained.

EXAMPLE 4

An electrode was produced. The anode active material for the electrode was the nonwoven fabric of the example 1.

Figure 7:
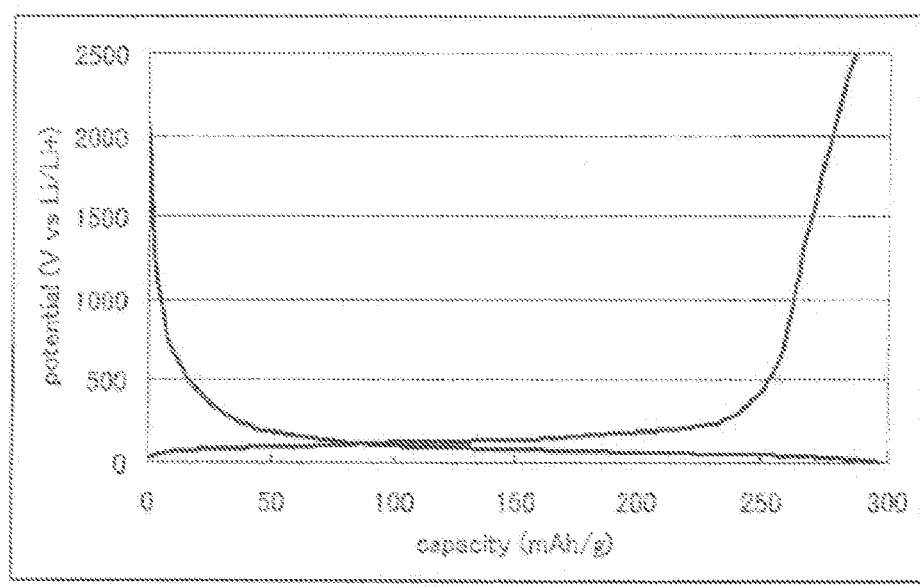
FIG. 7 is a charging/discharging characteristic diagram.

Charging/discharging measurement was carried out by using lithium for the counter electrode. The result of the measurement is shown in FIG. 7.

It is clear from the result that the nonwoven fabric of the example 1 is suitable for the anode material for lithium-ion secondary batteries.

EXAMPLE 5

10 mg of the carbon fiber nonwoven fabric (nonwoven fabric made of carbon fiber) obtained in the example 1 was put in a glass bottle and 10 g of water was poured into the bottle. Thereafter, the contents of the bottle were irradiated with ultrasonic waves. By the ultrasonic irradiation, the nonwoven fabric was unraveled, that is, carbon fiber was obtained. A carbon fiber dispersion liquid obtained by the ultrasonic irradiation was filtered by use of a filter, by which the carbon fiber was collected.

Figure 8:
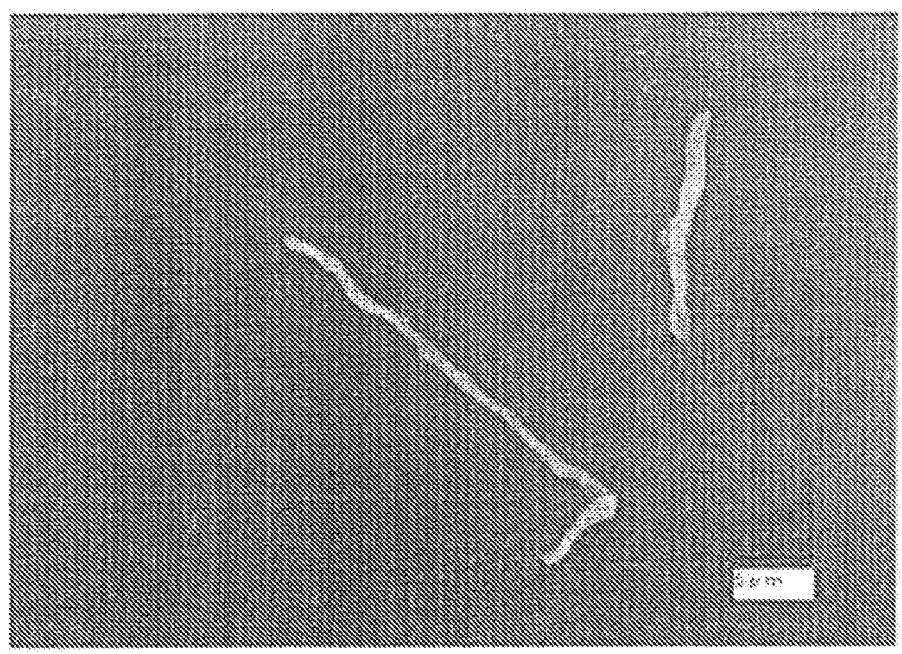
FIG. 8 is a SEM photograph.

A SEM photograph of the carbon fiber obtained in this example (SEM apparatus: VE-8800 manufactured by Keyence Corporation) is shown in FIG. 8.

96 pts. mass of lithium cobaltate (produced by Hohsen Corp.), 2 pts. mass of polyvinylidene difluoride (produced by Sigma-Aldrich Corporation), and 2 pts. mass of the above carbon fiber were mixed together. Addition of N-methylpyrrolidone turned the mixture into a paste-like material. Copper foil was coated with the paste-like material by using a bar coater (film thickness after drying: 20 μm). Thereafter, the drying was conducted and a cathode for a lithium-ion secondary battery was produced.

The surface electric resistance of the cathode was measured by the four-probe method (by using the apparatus manufactured by Mitsubishi Chemical Analytech Co., Ltd.). The result was 0.1 Ω/square.

COMPARATIVE EXAMPLE 2

An experiment was carried out similarly to the example 5 except that the carbon fiber nonwoven fabric obtained in the comparative example 1 was used instead of the carbon fiber nonwoven fabric obtained in the example 1. A cathode for a lithium-ion secondary battery was produced.

The surface electric resistance of the cathode was measured by the four-probe method (by using the apparatus manufactured by Mitsubishi Chemical Analytech Co., Ltd.). The result was 0.3 Ω/square.

EXAMPLE 6

0.5 pts. mass of the carbon fiber obtained in the example 5 and 10 pts. mass of a polyvinyl alcohol solution (solid content concentration: 15 wt %) were mixed together. The mixture (composite material) was applied (film thickness: 1 mm) on aluminum foil. Another sheet of aluminum foil was stacked on the coating. This structure was dried at 60° C. for 12 hours. Consequently, the two aluminum foil sheets were bonded together by the composite material.

The electric resistance between the two aluminum foil sheets was 2 mΩ. This indicates that the composite material between the aluminum foil sheets has an electrically conductive property. The adhesion strength was 95 g/cm. This indicates that the composite material has an adhesive property.

EXAMPLE 7

60 pts. mass of polyvinyl alcohol (product name: POVAL 224: produced by Kuraray Co., Ltd.), 40 pts. mass of mesophase pitch (product name: AR: produced by Mitsubishi Gas Chemical Company, Inc.), and 900 pts. mass of water were mixed together by using the beads mill. By this process, a mesophase pitch dispersion liquid containing polyvinyl alcohol dissolved therein was prepared.

A centrifugal spinning apparatus (see FIGS. 1 and 2, distance between the nozzle and the collector body: 1.3 m, disk revolution speed: 12,000 rpm) was used. Namely, the centrifugal spinning was conducted by using the above dispersion liquid (viscosity: 1000 mPa·S (measured with the coaxial cylinder viscometer (BH-type Viscometer manufactured by Tokimec Inc.))). Nonwoven fabric made of a carbon fiber precursor was produced on the collector plate. According to this method, fiber spinning equivalent to 20 kg (in terms of weight after the graphitization) was successfully performed in an hour.

Thereafter, the nonwoven fabric was heated up to 800° C. in an argon gas atmosphere.

Subsequently, the nonwoven fabric was heated up to 3000° C. in the graphitizing furnace.

Figure 9:
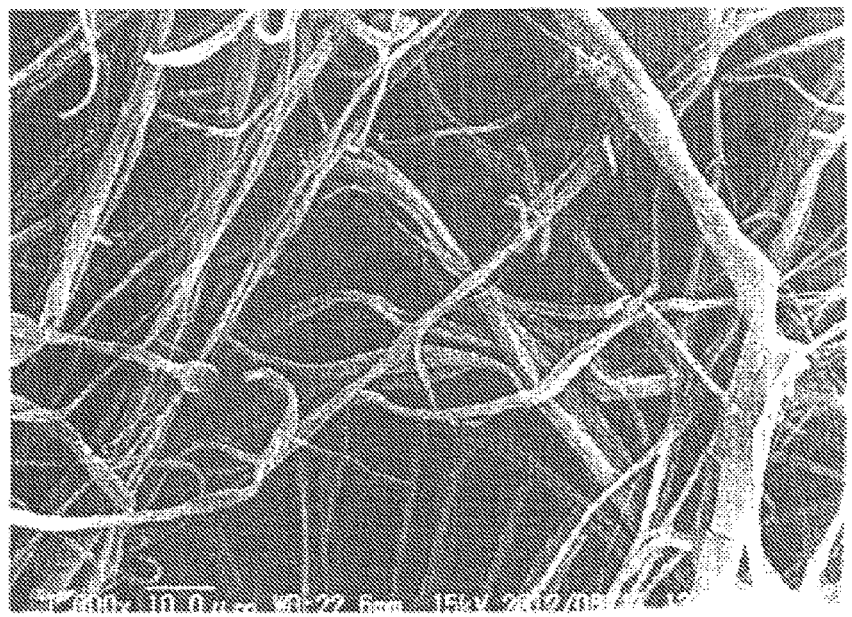
FIG. 9 is a SEM photograph.

A SEM photograph of the nonwoven fabric obtained in this example (SEM apparatus: VE-8800 manufactured by Keyence Corporation) is shown in FIG. 9. The carbon fiber in this nonwoven fabric had large diameter parts where the diameter of the carbon fiber is large (diameter: 20 nm-5 μm) and small diameter parts where the diameter of the carbon fiber is small (diameter: 10 nm-3 μm). Of course, the condition (diameter in the large diameter part)>(diameter in the small diameter part) was satisfied.

Figure 10:
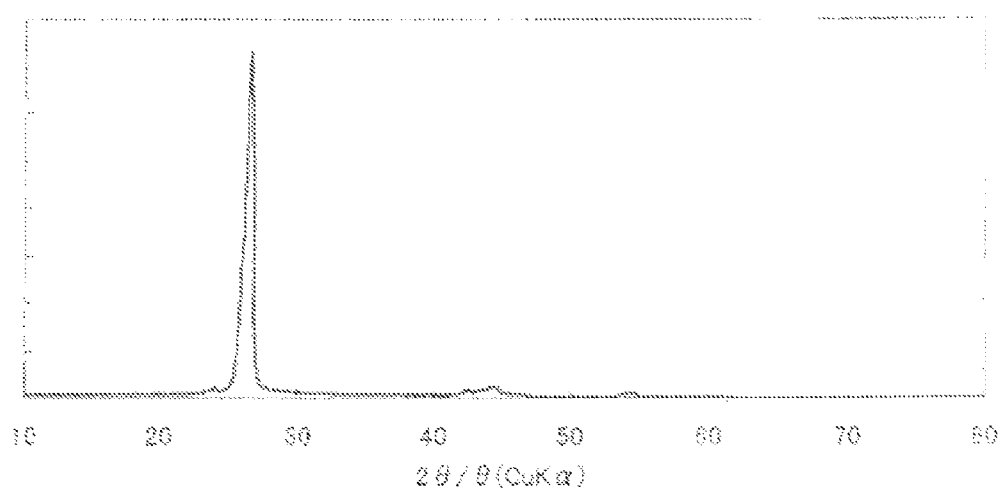
FIG. 10 is an X-ray diffraction diagram.

The result of X-ray diffraction measurement is shown in FIG. 10. A peak deriving from the graphite structure (002) was found in a range of 25°-30° (2θ). The half value width of the peak was 0.1-2.

The specific surface area according to the BET method was 8.98 m²/g.

Figure 11:
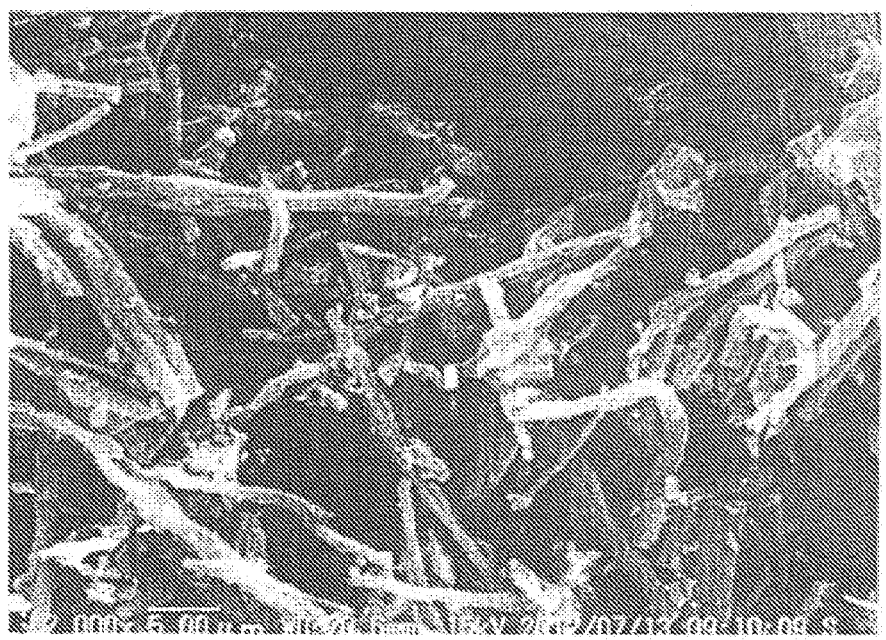
FIG. 11 is a SEM photograph.

The obtained carbon fiber nonwoven fabric was pulverized by using a jet mill. Thereafter, the cyclone classification was carried out. A SEM photograph of the carbon fiber obtained as above is shown in FIG. 11.

A cathode for a lithium-ion secondary battery was produced similarly to the example 5 by using the carbon fiber obtained in this example.

The surface electric resistance of the cathode was measured by the four-probe method (by using the apparatus manufactured by Mitsubishi Chemical Analytech Co., Ltd.). The result was 0.1Ω/square.

Figure 12:
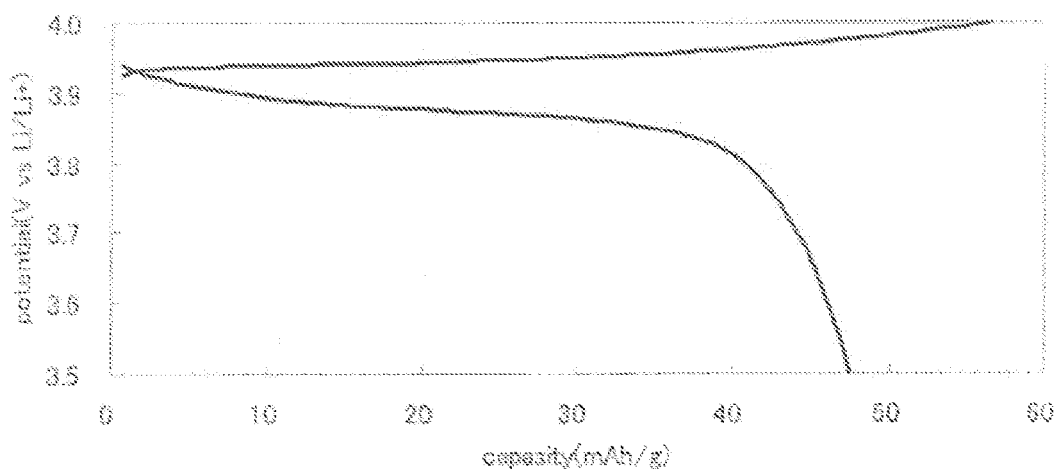
FIG. 12 is a charging/discharging characteristic diagram.

Charging/discharging measurement was carried out by using lithium for the counter electrode. The result of the measurement is shown in FIG. 12.

It is clear from the result that the carbon fiber of this example is suitable as a conductive assistant for lithium-ion secondary batteries.

REFERENCE CHARACTER LIST 1 rotating body (disk)
2 inner part (hollow part)
3 collector plate
4 nonwoven fabric

The invention claimed is:

1. A method of manufacturing a carbon fiber material, the method comprising:
   centrifugally spinning a dispersion liquid comprising a resin, carbon particles, and a solvent, to obtain a nonwoven fabric comprising a carbon fiber precursor; and
   denaturing the nonwoven fiber comprising the carbon fiber precursor, to obtain a nonwoven fabric comprising carbon fiber having a large diameter part extending a first length and a second smaller diameter part extending a second length.

2. The method of claim 1, wherein the dispersion liquid has viscosity of 10-10,000 mPa·S in measurement with a coaxial cylinder viscometer.

3. The method of claim 1, wherein the dispersion liquid has a solid content concentration of 0.1-50 mass %.

4. The method of claim 1, wherein the centrifugal spinning is performed with a centrifugal spinning device having a disk spinning speed from 1,000-100,000 rpm.

5. The method of claim 1, wherein the dispersion liquid contains at least pitch.

6. The method of claim 1, further comprising, after the denaturing:
   unraveling the nonwoven fabric to obtain carbon fiber.

7. The method of claim 6, wherein the unraveling is executed by a media-less mill method.

8. The method of claim 6, wherein the unraveling is executed by an air jet mill method.

9. The method of claim 6, wherein the unraveling is executed by an ultrasonic irradiation method.

10. The method of claim 6, further comprising, after the unraveling;
    classifying the carbon fiber.

11. A carbon fiber material obtained by the method of claim 1.

12. The carbon fiber material of claim 11, wherein the carbon fiber of the carbon fiber material has a large diameter part where the diameter of the carbon fiber is from 20 nm to 5 μm and a small diameter part where the diameter of the carbon fiber is from 10 nm to 3 μm, and
    wherein a condition (diameter in the large diameter part)> (diameter in the small diameter part) is satisfied.

13. A member, comprising the carbon fiber material of claim 11.

14. The member of claim 13, wherein the member is an electrode of a battery.

15. The member of claim 13, wherein the member is an electrode of a lithium-ion secondary battery.

16. The member of claim 13, wherein the member is an electrode of a lithium-ion secondary battery and contains a conductive assistant made of carbon fiber material.

17. The member of claim 13, wherein the member is an electrode of a capacitor.

18. The member of claim 13, wherein the member is a porous carbon electrode base material for a fuel cell.

19. An electrical device, comprising the member of claim 13.

20. A filter, comprising the carbon fiber material of claim 11.

21. Polymeric composite material, comprising carbon fiber material of claim 11.

22. The method of claim 1, wherein the solvent is a solvent that volatizes during the centrifugal spinning.

23. The method of claim 1, wherein the solvent is at least one selected from the group consisting of water, an alcohol, an acid, an ester, and an ether.

24. The method of claim 1, wherein the resin is a resin that dissolves in the solvent.

25. The method of claim 1, wherein the resin is a water-soluble resin.

* * * * *